(12) United States Patent
Sevastianov et al.

(10) Patent No.: US 7,990,380 B2
(45) Date of Patent: Aug. 2, 2011

(54) DIFFUSE PHOTON MAP DECOMPOSITION FOR PARALLELIZATION OF GLOBAL ILLUMINATION ALGORITHM

(75) Inventors: Igor Sevastianov, Nizhni Novgorod (RU); Alexei M. Soupikov, Nizhni Novgorod (RU); Alexander V. Reshetov, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 1168 days.

(21) Appl. No.: 10/953,868

(22) Filed: Sep. 30, 2004

(65) Prior Publication Data
US 2006/0066616 A1 Mar. 30, 2006

(51) Int. Cl.
*G06T 15/50* (2011.01)
(52) U.S. Cl. ......................................... 345/426
(58) Field of Classification Search .................... 345/426
See application file for complete search history.

(56) References Cited

U.S. PATENT DOCUMENTS 5,977,965 A * 11/1999 Davis et al. .................... 715/723
2005/0264564 A1* 12/2005 Keller ........................... 345/421

OTHER PUBLICATIONS

Henrik Wann Jensen, "Global Illumination Using Photon Maps," Jun. 17, 1996, Rendering Techniques '96 (Proceedings of the Seventh Eurographics Workshop on Rendering), p. 21-30.*
Mike Cammarano and Henrik Wann Jensen, "Time Dependent Photon Mapping," Jun. 26, 2002, Rendering Techniques 2002 (Proceedings of the 13th Eurographics Workshop on Rendering), p. 135-144.*
Bent Dalgaard Larsen and Niels Jorgen Christensen, "Optimizing Photon Mapping Using Multiple Photon Maps for Irradiance Estimates," Feb. 3, 2003, WSCG 2003 Poster Proceedings.*
Timothy J. Purcell, Craig Donner, Mike Cammarano, Henrik Wann Jensen, and Pat Hanrahan, "Photon Mapping on Programmable Graphics Hardware," Jul. 26, 2003, In Proceedings of the ACM SIGGRAPH/Eurographics Conference on Graphics Hardware, p. 41-50.*
Henrik Wann Jensen, "Realistic Image Synthesis Using Photon Mapping," Jul. 2001, A.K. Peters, Ltd., p. 75-80.*
Henrik Wann Jensen, "Global Illumination Using Photon Maps," Jun. 17, 1996, Rendering Techniques '96 (Proceedings of the Seventh Eurographics Workshop on Rendering), p. 21-30.*
Henrik Wann Jensen, "Rendering Caustics on Non-Lambertian Surfaces," May 1996, Proceedings of the Conference on Graphics Interface '96.*
Per H. Christensen, "Faster Photon Map Global Illumination," Apr. 2000, Journal of Graphics Tools, vol. 4, No. 3, p. 1-10.*
Larsen, B., et al., "Optimizing Photon Mapping Using Multiple Photon Maps for Irradiance Estimates," WSCG Poster proceedings (Feb. 2003), <http://wscg.zcu.cz/wscg2003/Papers_2003/G79.pdf>.
Lavignotte, F., et al., "A New Approach of Density Estimation for Global Illumination," IRIT—Université Paul Sabatier (2002), <http://wscg.zcu.cz/wscg2002/Papers_2002/D53.pdf>.

(Continued)

*Primary Examiner* — Jason M Repko
(74) *Attorney, Agent, or Firm* — Trop, Pruner & Hu, P.C.

(57) ABSTRACT

A given computer graphics scene may be rendered as a set of triangles. A set of photons may be distributed over the scene, and a number of steps may be performed for each triangle. For each triangle, a list of photons may be constructed. For that triangle, a set of control points may be identified for purposes of determining global illumination. For each control point, a specific illumination estimate may be computed. A kd-tree of the control points of the triangle may be built. An illumination estimate may then be drive for the triangle.

22 Claims, 9 Drawing Sheets

OTHER PUBLICATIONS

Ureña-Almagro, C., et al., "Density Estimation on the Tangent Plane for Radiosity," Dagstuhl Seminar: Monte Carlo Methods in Rendering (Jun. 2001), <http://giig.ugr.es/~curena/abstr/dagstuhl/dagstuhl.pdf>.

* cited by examiner

DIFFUSE PHOTON MAP DECOMPOSITION FOR PARALLELIZATION OF GLOBAL ILLUMINATION ALGORITHM

BACKGROUND OF THE INVENTION

Some embodiments of the invention described may relate to computer graphics, and in particular, to illumination.

Stated generally, computer graphics rendering is a process by which graphics instructions and data are received and processed so that image data is produced. This image data may then be sent to an input/output device (I/O) such as a display. Rendering creates data that may be displayed as an image. The resulting image (or set of resulting images) that is displayed in aggregate at a given point in time is known as a scene. A scene represents a computer rendering of what a camera or viewer might see at a given moment in time.

Rendering may include a number of processes, one of which is ray tracing. In ray tracing, the path taken by a ray of light through a scene may be traced, as the ray undergoes reflection, refraction, and/or absorption whenever it touches an object in the scene. For example, given a light source, a ray of light may be traced to some surface, which may be transparent but may refract the light ray in a different direction while absorbing some of the spectrum and altering the color at the surface. From this point, the ray may impinge on another surface that may not be transparent. Here the light may undergo both absorption (which may further change the color) and reflection (which changes the direction). From the second surface, the ray may be reflected into a virtual camera where its color may contribute to a final rendered image. Because ray tracing may take into account such phenomena as reflection and shadows, this method may offer considerable realism compared to other rendering methods.

One particular rendering technique based on ray tracing technique is photon mapping. Traditional ray tracing is able to capture local illumination. Photon mapping may allow simulation of aspects of global illumination, such as refraction of light through a transparent substance, inter-reflections between illuminated objects, and some of the effects caused by atmospheric particulate matter such as smoke or vapor. With photon mapping, light packets (i.e., photons) may be into a scene from a light source. Whenever they intersect a surface, the three dimensional coordinates of the intersection may be stored in a cache, sometimes called the photon map. In addition, the incoming direction of the photon and the energy of the photon may be stored. As each photon is reflected or refracted by intermediate surfaces, the energy of the photon may diminish until no more is left. The path of the photon is then no longer traced. Alternatively, the tracing may be stopped after some predefined number of reflections, in order to save processing time.

Traditional photon mapping may use a single list of photons that is organized using one relatively large topological structure. One such structure that can be utilized for this is a kd-tree. A kd-tree may be viewed as a hierarchical partitioning of a space into cells, such that no cell has an excessive number of items (in this case, photons). Each node of the tree is defined by a plane through one of the dimensions that partitions the set of items into left/right (or up/down) sets, each set having half the items of the parent node. These children are again partitioned into equal halves, using planes through a different dimension. Partitioning stops after a some number of levels with each item in its own cell, i.e., associated with its own leaf. Creating a kd-tree for a single large set of photons (e.g., a kd-tree of tens of millions of photons) may be computationally expensive and difficult to efficiently search. Accordingly, such a kd-tree may become a bottleneck for processing purposes.

BRIEF DESCRIPTIONS OF THE FIGURES

The present invention will be described with reference to the accompanying drawings. The drawing in which an element first appears is indicated by the leftmost digit(s) in the corresponding reference number.

DETAILED DESCRIPTION OF EMBODIMENTS OF THE INVENTION

Figure 1:
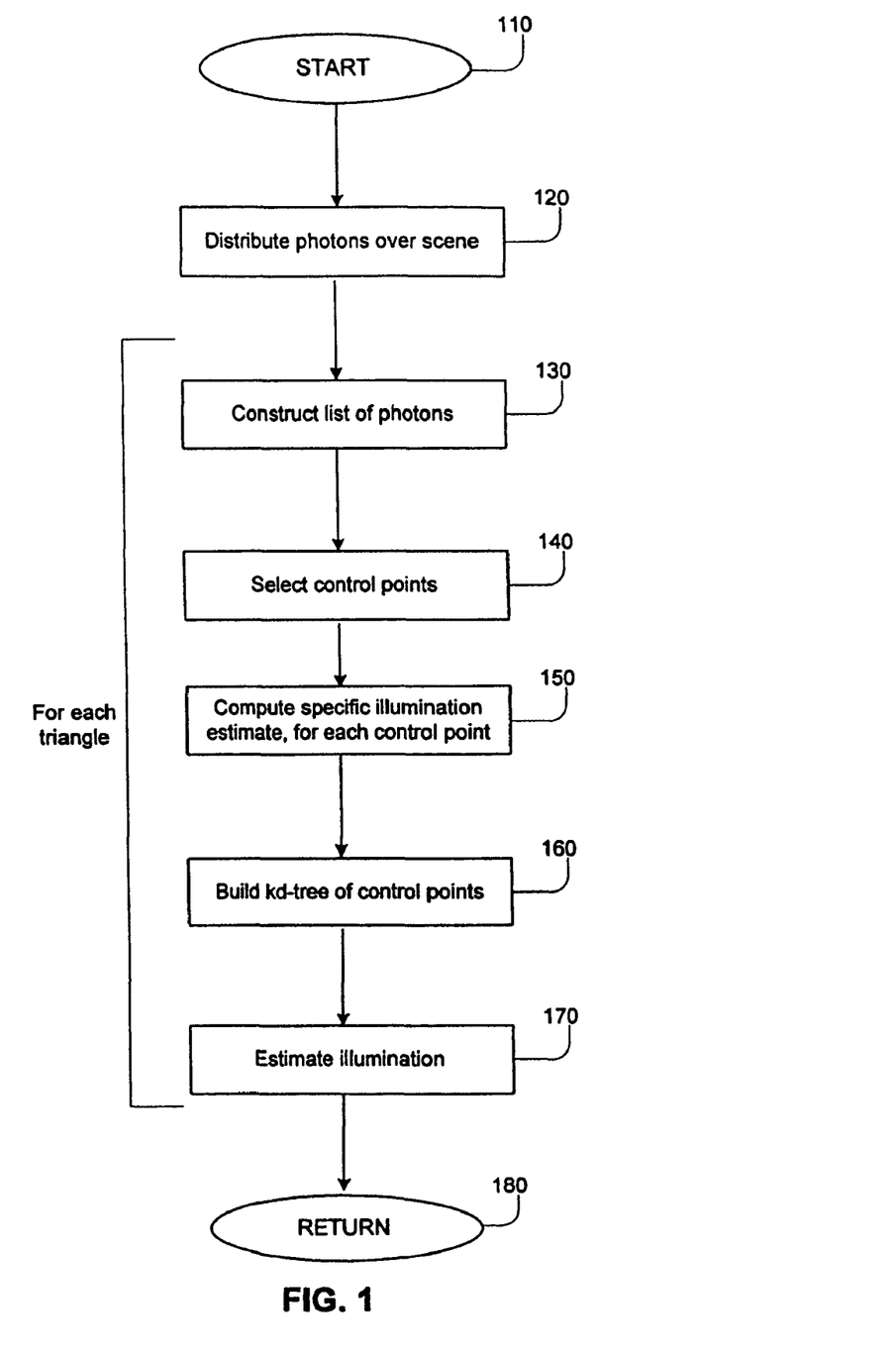
FIG. 1 is a flowchart illustrating the overall process of an embodiment of the invention.

FIG. 1 illustrates the overall processing of an embodiment of the invention. The process may begin at block 110. In block 120, photons may be distributed over the scene to be rendered. Given that a scene may be rendered as a set of triangles, blocks 130 through 170 of FIG. 1 may be performed for each triangle or for each of a subset of the triangles. In block 130, a list of photons may be constructed for a triangle. In block 140, control points within the triangle may be selected. A control point is a reference point for a neighborhood or region of the triangle. The illumination at the control point will be estimated. This will allow the estimation of illumination at other points in the region. The selection and role of control points will be described further below. In block 150, the specific illumination estimate may be constructed for each of one or more control points in the triangle. In block 160, a kd-tree of the control points may be built. In block 170, illumination may be estimated. The process may conclude at block 180.

Note that because blocks 130 through 170 may be performed for each triangle, the process of FIG. 1 may lend itself to parallelization. In particular, in an embodiment of the invention, blocks 130 through 170 may be performed for each of a plurality of triangles more or less simultaneously. This may allow for fast and efficient execution of the overall process and may facilitate efficient rendering. Alternatively, blocks 130 through 170 can be executed for each triangle, one triangle at a time, in serial.

Figure 2:
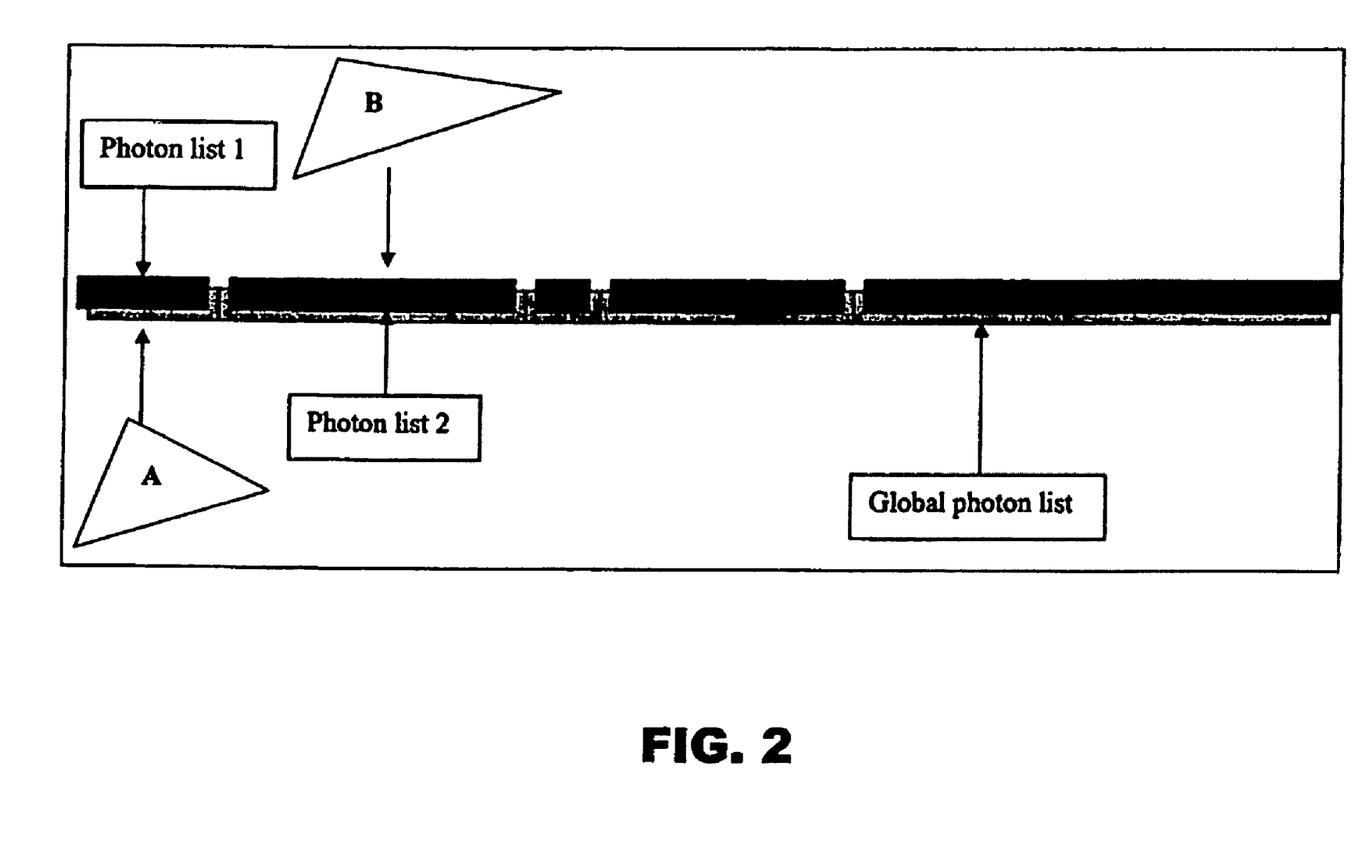
FIG. 2 illustrates the correspondence between triangles and photon lists, according to an embodiment of the invention.

Block 130, the construction of a list of photons for each triangle, is illustrated graphically in FIG. 2 according to an embodiment of the invention. In this example, several photon lists are illustrated, including photon lists 1 and 2. Photon list 1 may be associated with a triangle A. Photon list 2 may be associated with triangle B. Each photon list may identify the photons that strike the particular triangle. Likewise, a photon list may be created for each triangle in a scene. In addition to the photon lists, in an embodiment of the invention a global photon list may be maintained. The global photon list may be used for such processes as the determination of specular illumination or the creation of volume effects.

Figure 3:
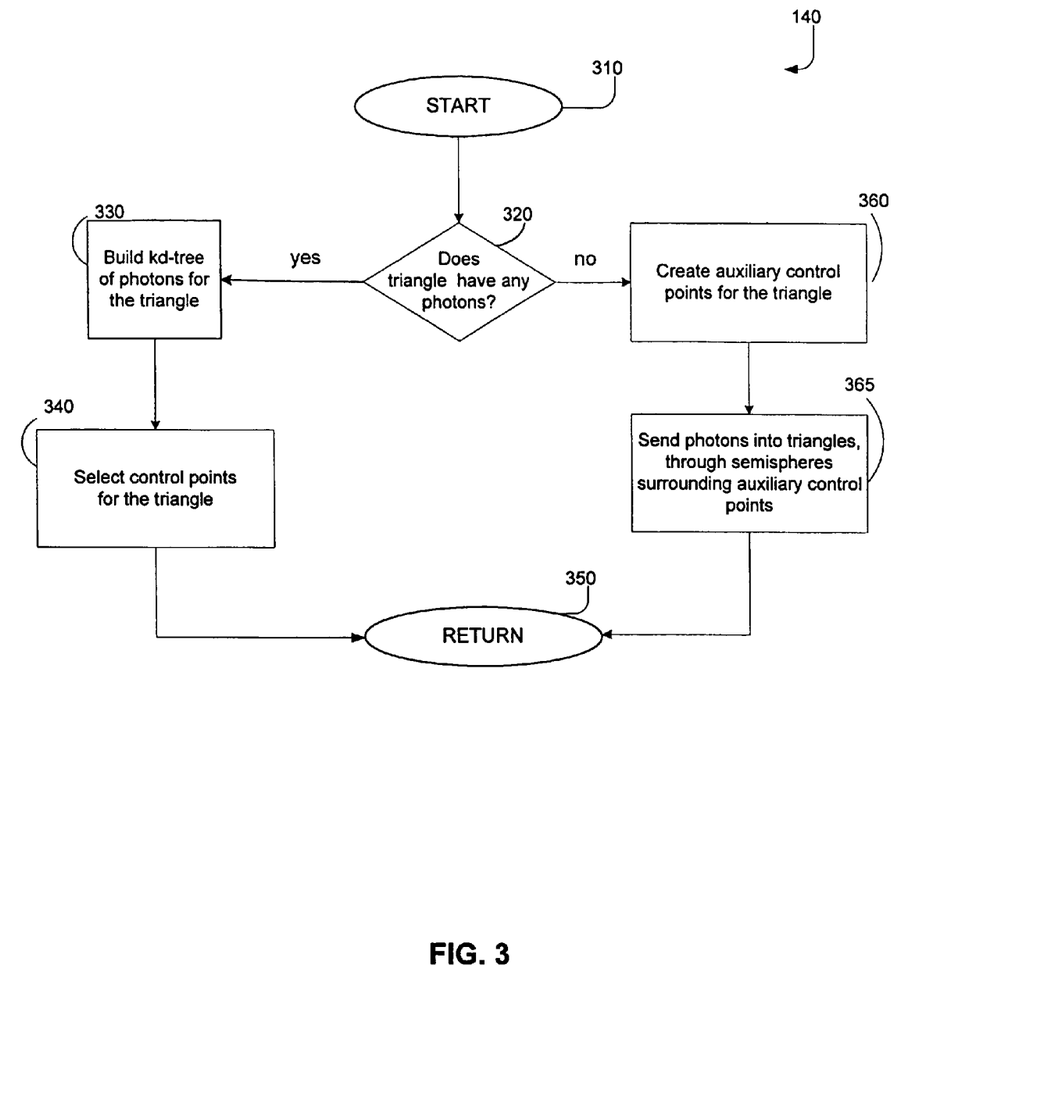
FIG. 3 is a flowchart illustrating the process of selecting control points, according to an embodiment of the invention.

Block 140, the selection of control points for a triangle, is illustrated in greater detail in FIG. 3 according to an embodiment of the invention. The process may begin at block 310. In block 320, a determination may be made as to whether the triangle has any photons associated with it. If so, then in block 330, a kd-tree may be built, identifying photons that hit the triangle. In block 340, control points may be selected for the triangle. The role of control points will be discussed in greater detail below. The number of control points chosen for a given triangle may depend on a number of factors. For example, a larger number of control points may yield a higher quality image. Moreover, a larger triangle may require a greater number of control points. In addition, if the illumination changes over time, relatively slow change may mean that fewer control points may be necessary for the triangle. If illumination changes more quickly, a greater number of control points may be needed to achieve satisfactory results.

If it is determined in block 320 that the triangle has no photons, then the process may continue at block 360. Block 360 addresses the case where a triangle in a scene may be too small to receive any photons, for example. Here, one or more auxiliary control points may be created for the triangle. In an embodiment of the invention, the number of control points chosen may be proportional to the area of the triangle. In block 365, photons may be sent into the triangle, into neighborhoods surrounding each auxiliary control point. In an embodiment of the invention, for each auxiliary control point, rays may be sent into a semisphere surrounding the auxiliary control point. In this way, photons may be created for a triangle that may otherwise have none. The process may then conclude at block 350.

Figure 4:
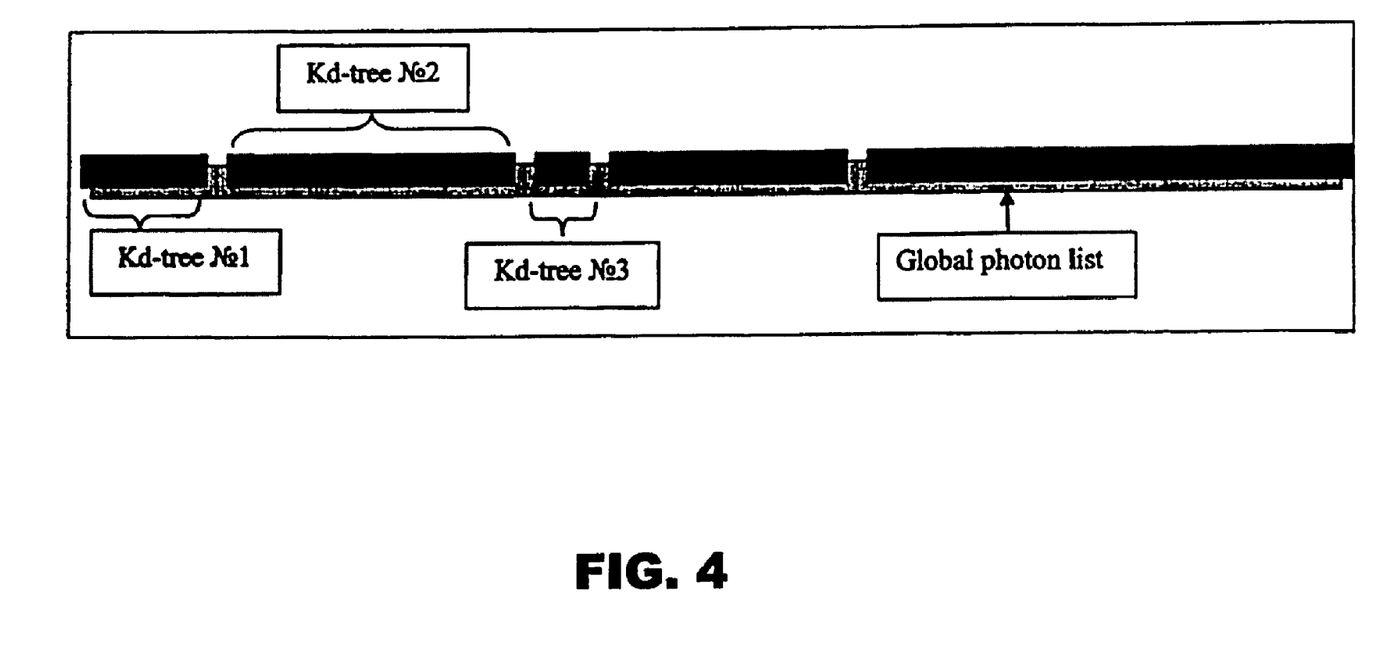
FIG. 4 illustrates the correspondence between kd trees and photon lists, according to an embodiment of the invention.

FIG. 4 illustrates the correspondence between kd-trees and the sets of photons that may strike respective triangles. Each highlighted rectangle may represent a set of photons that strike a triangle. For each such set of photons, a kd-tree may be constructed. Hence a kd-tree may be constructed for each triangle.

Figure 5:
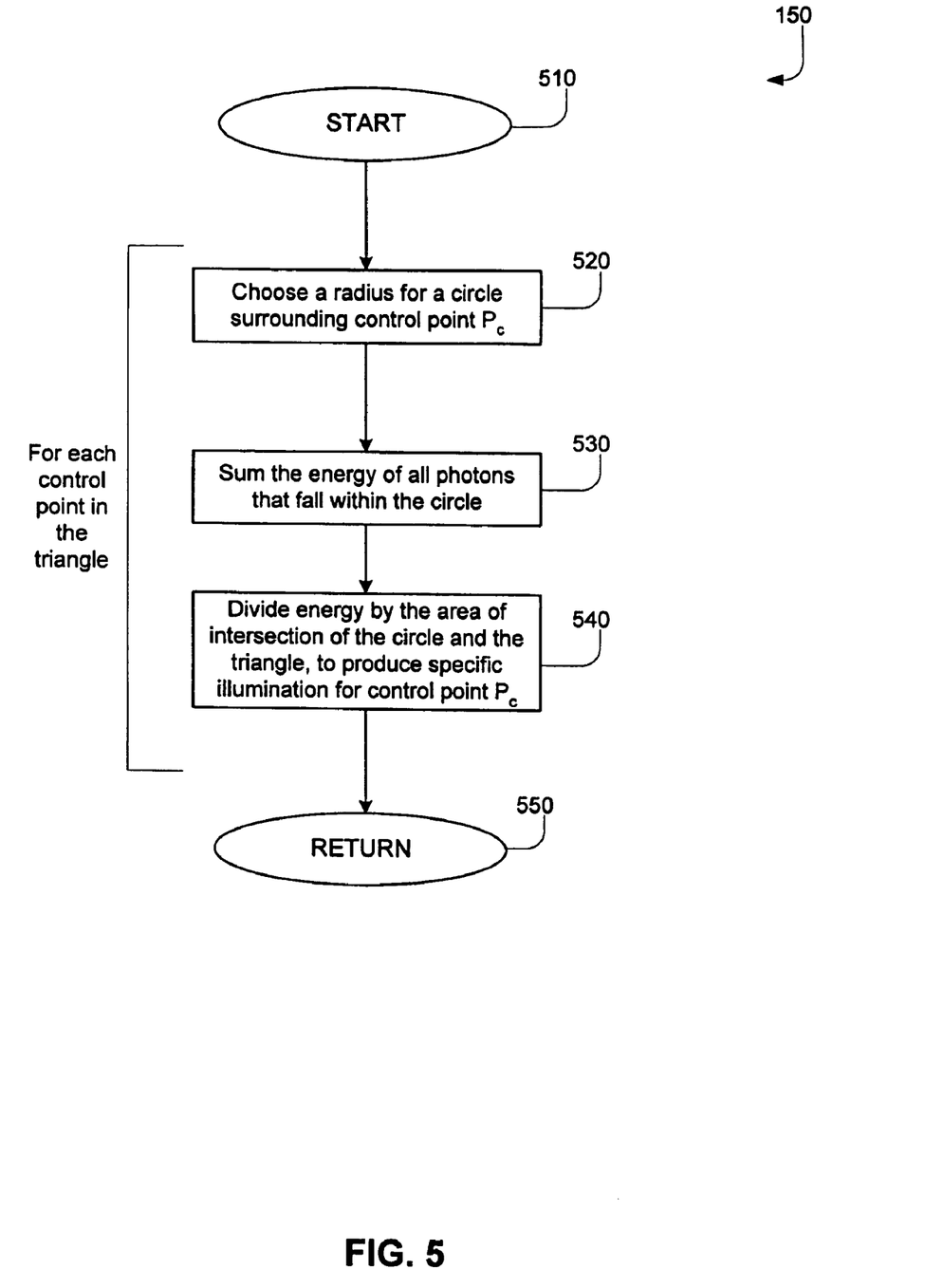
FIG. 5 is a flowchart illustrating the process of computing the specific illumination around control points, according to an embodiment of the invention.

Block 150, the computation of a specific illumination estimate for each control point in a given triangle, is illustrated in greater detail in FIG. 5 according to an embodiment of the invention. This process may also be applied to triangles for which auxiliary control points may have been created in block 360 above. The process may begin with block 510. Blocks 520, 530, and 540 may then be performed for each control point in the triangle or for some subset of control points in the triangle. In block 520, for a control point Pc, a radius may be chosen for a circle surrounding the control point. The radius may be chosen on the basis of the number of photons within the circle, or on the basis of available computational capacity. Less computational capacity may require the choice of a smaller radius, so that fewer photons need to be processed, for example. In block 530, the energy of all the photons that fall within the circle may be calculated by summation.

Simply using this energy value, however, may result in a biased illumination estimate. Therefore, in block 540, an area of intersection may be calculated, representing the intersection of the circle and the triangle. The total energy calculated in block 530 may then be divided by the area of this intersection. This may produce a specific illumination for control point Pc, given the per-triangle approach of the invention. Note that because blocks 520 through 540 may be performed for each control point in the triangle, in an embodiment of the invention this sequence of blocks may be executed in parallel for some or all control points in the triangle. This may speed up the process of block 150 and may improve rendering throughput. In an alternative embodiment of the invention, blocks 520 through 540 may be executed for each control point, one control point at a time, in serial. The process may conclude at block 550.

In an alternative embodiment of the invention, for a given control point, the k nearest photons may be used for the illumination estimate, for some predefined integer k, instead of using the photons within a certain radius of the control point.

Figure 6:
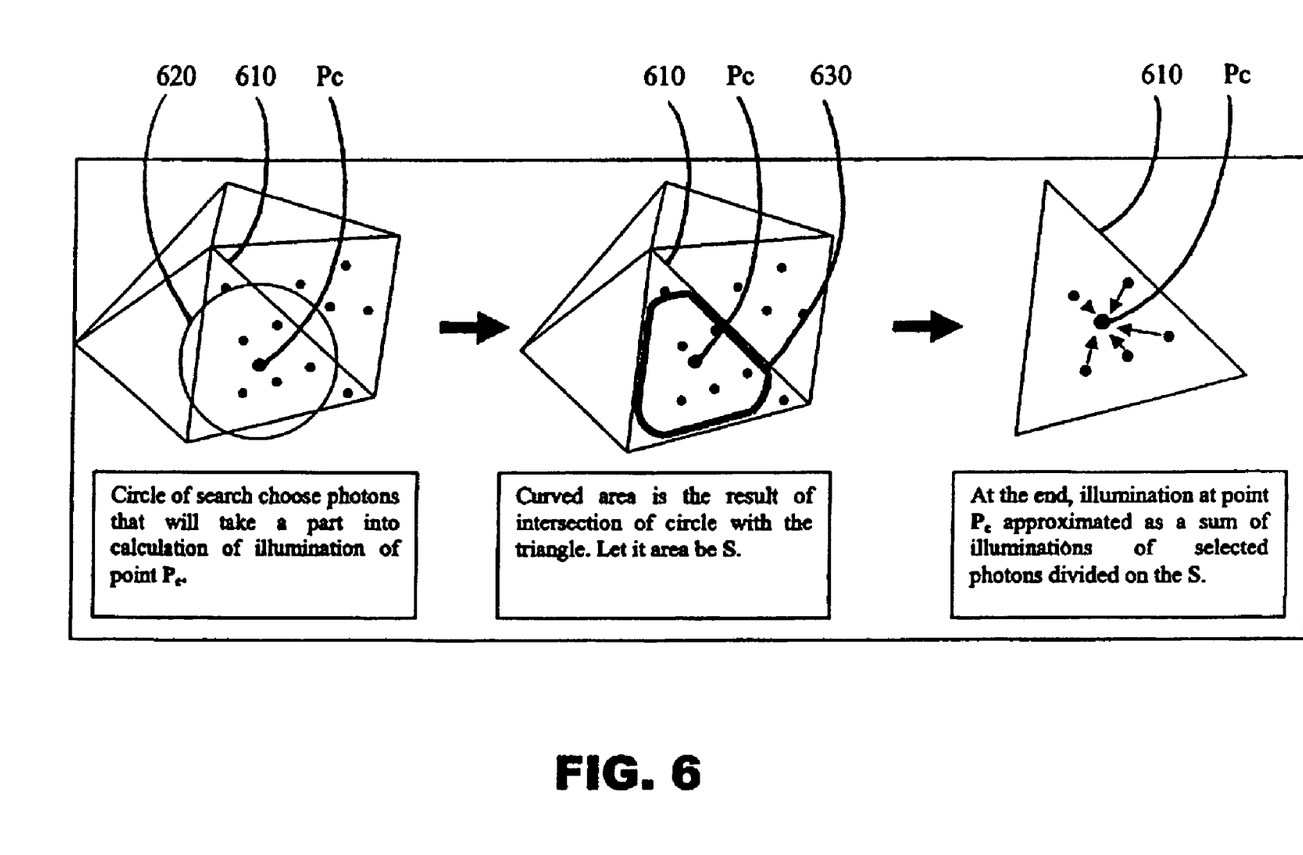
FIG. 6 illustrates graphically the process of computing the specific illumination in a region around a control point, according to an embodiment of the invention.

The process of FIG. 5 is illustrated graphically in FIG. 6, according to an embodiment of the invention. In the left-most diagram, a triangle 610 is shown. Within triangle 610, a control point Pc has been chosen. Note that while only one control point is identified in triangle 610, a plurality of control points may be possible. A circle 620 may be drawn around control point Pc. In the center diagram, the intersection of circle 620 and triangle 610 is shown. The area of intersection may be defined by perimeter 630. In the right-most diagram, the illumination at control Pc may be approximated as the sum of the illuminations at all points in circle 620, divided by the area within perimeter 630.

Figure 7:
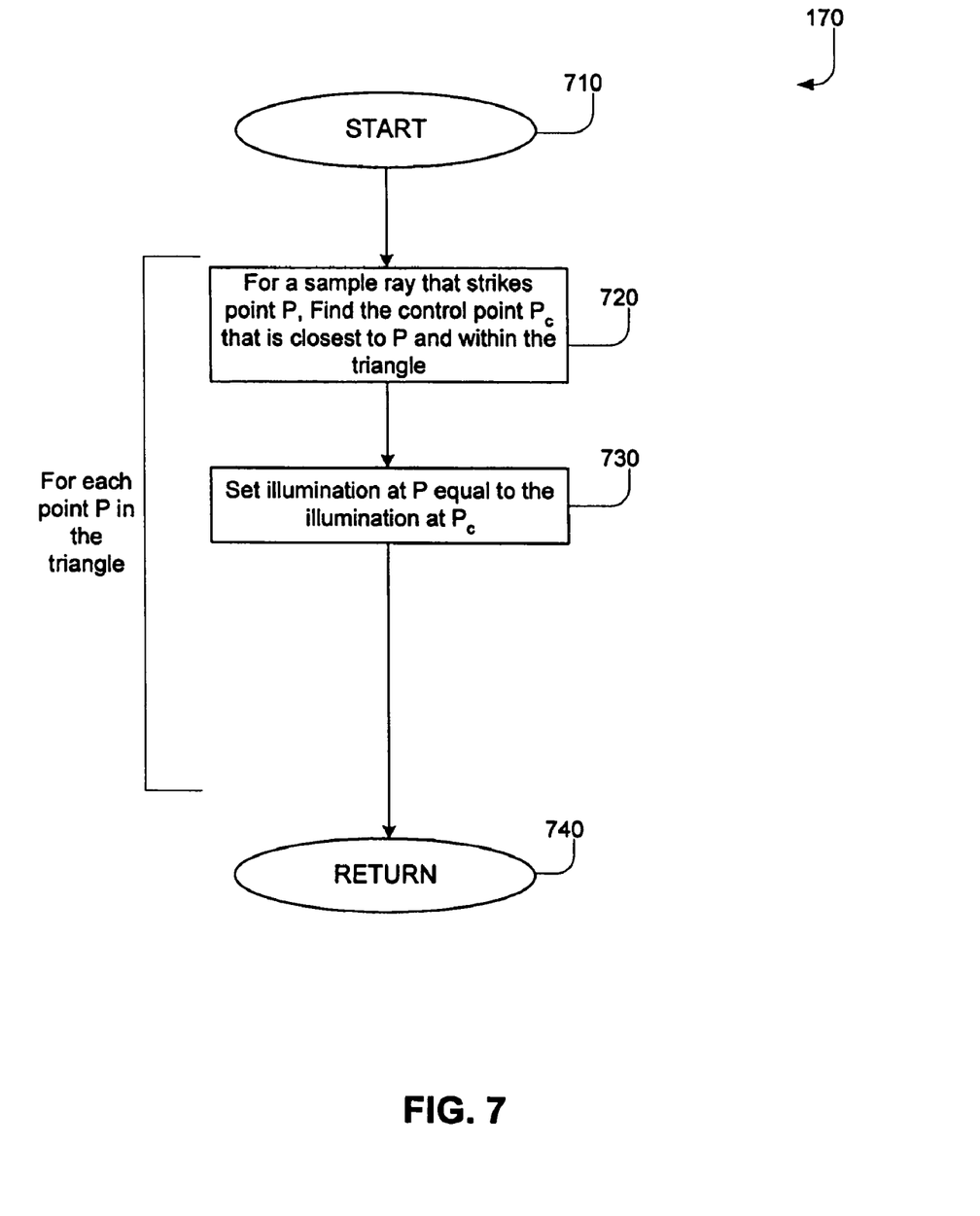
FIG. 7 is a flowchart illustrating the process of estimating illumination for a triangle, according to an embodiment of the invention.

Block 170, estimating the illumination, is illustrated in greater detail in FIG. 7 according to an embodiment of the invention. The process may begin at block 710. In block 720, for a point P in the triangle struck by a photon, the process may find the control point Pc that is closest to P and within the triangle. In block 730, the illumination at point P may be set to equal to the illumination at point Pc, determined at block 150. The process may conclude at block 740.

Note that the sequence of blocks 720 and 730 may be executed for each point P struck by a photon in the triangle. For this reason, the sequence of blocks 720 and 730 may be performed in parallel for any or all of the points P in the triangle. Alternatively, these blocks may be executed for each point P in serial.

In an embodiment of the invention, the overall process may be varied if the scene is very large (for example, if the scene includes millions of triangles). Here, photons may be distributed over the triangles, but control points may be identified for a given triangle only when it is determined that the triangle affects the illumination estimate, i.e., only if a ray strikes the triangle.

The process described above may be embodied in a computer graphics renderer. Logic that implements this process may take the form of hardware. Alternatively, the logic may be implemented in software and/or firmware that may execute in a computing system as illustrated in FIG. 8.

Figure 8:
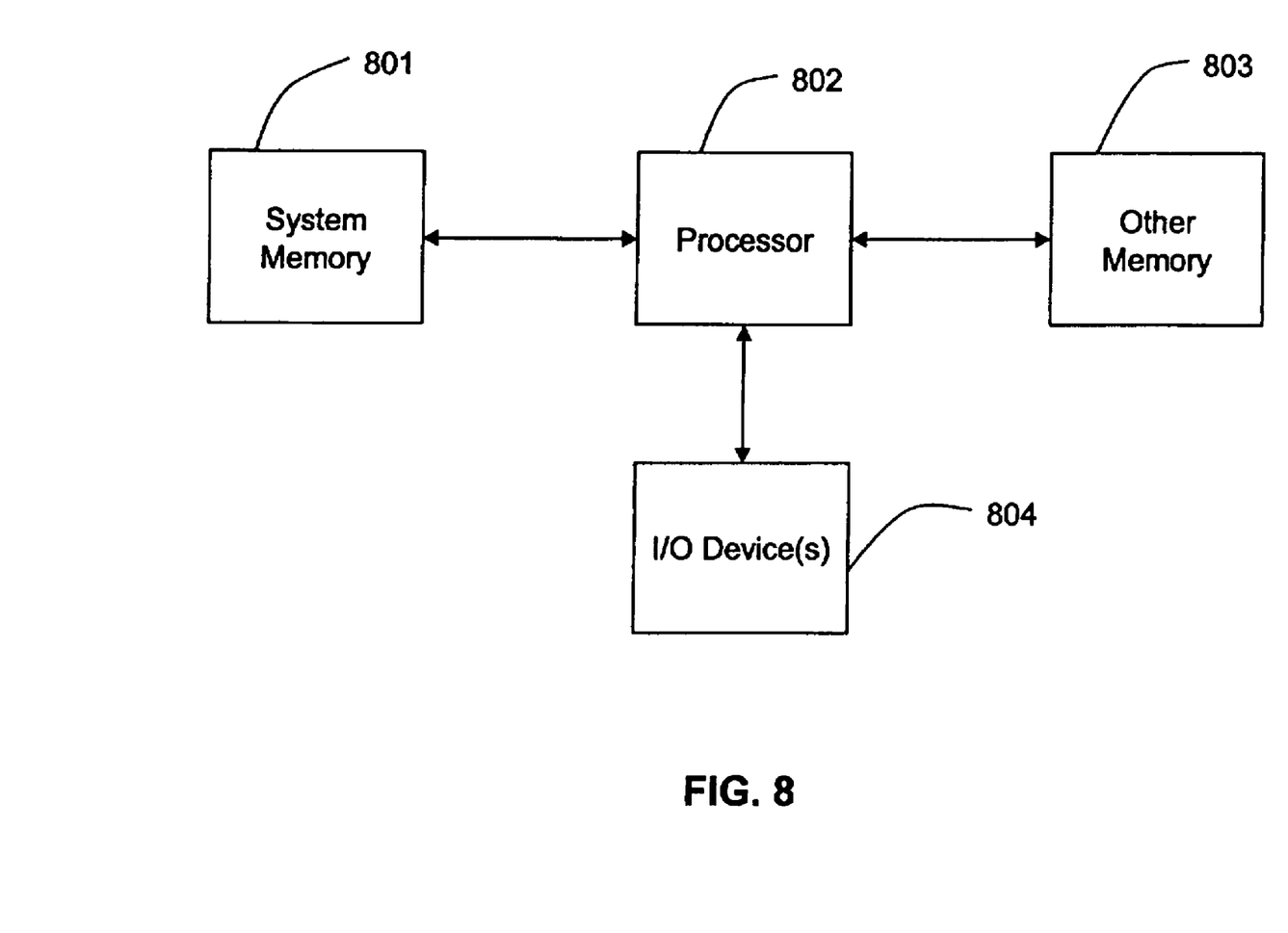
FIG. 8 is a block diagram illustrating an example computing platform on which a software or firmware implementation of an embodiment of the invention may execute.

The computing system of FIG. 8 may include at least one processor 802, with associated system memory 801, which may store, for example, operating system software and the like. The system may further include additional memory 803, which may, for example, include software instructions to perform various applications. The system may also include one or more input/output (I/O) devices 804, for example (but not limited to), keyboard, mouse, trackball, printer, display, network connection, etc. The present invention may be embodied as software instructions that may be stored in system memory 801 or in additional memory 803. Such software instructions may also be stored in removable or remote media (for example, but not limited to, compact disks, floppy disks, etc.), which may be read through an I/O device 804 (for example, but not limited to, a floppy disk drive). Furthermore, the software instructions may also be transmitted to the computer system via an I/O device 804 for example, a network connection.

In another embodiment, the invention may be implemented primarily in hardware using, for example, hardware components such as application specific integrated circuits (ASICs). Implementation of a hardware state machine so as to perform the functions described herein will be apparent to persons skilled in the relevant art(s). As discussed above, the invention may be implemented using any combination of hardware, firmware and software.

Figure 9:
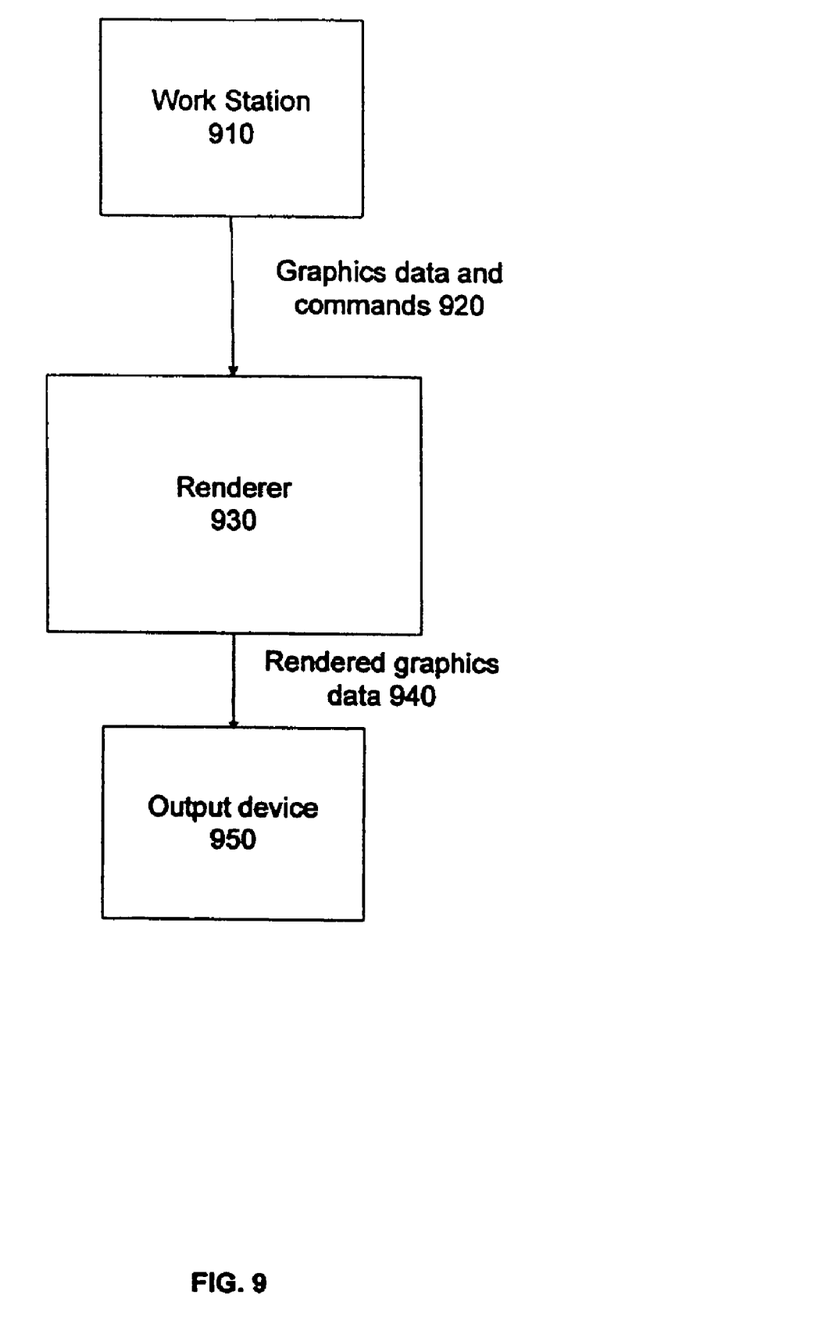
FIG. 9 is a block diagram illustrating a graphics renderer, according to an embodiment of the invention.

Whether the logic is embodied in software, firmware, or hardware, the logic may be executed in a computer graphics renderer, as illustrated in FIG. 9, according to an embodiment of the invention. In this embodiment, a computer graphics user at a workstation 910 may interface with a graphics application (not shown) and may thereby generate computer graphics commands and data 920. These commands and data may be sent to renderer 930. Renderer 930 may output rendered graphics data 940. The rendered graphics data 940 may then be sent to an output device 950, such as a display, printer, or memory device. In an alternative embodiment, workstation 910, renderer 930, and output device 950 may be implemented as a single computer graphics workstation. In yet another embodiment of the invention, workstation 910 may be connected to renderer 930 remotely through a network connection; in addition, renderer 930 may be connected to output device 950 remotely through a network connection.

While various embodiments of the present invention have been described above, it should be understood that they have been presented by way of example, and not limitation. It will be apparent to persons skilled in the relevant art that various changes in form and detail can be made therein without departing from the spirit and the scope of the invention.

The present invention has been described above with the aid of functional building blocks and method steps illustrating the performance of specified functions and relationships thereof. Boundaries of these functional building blocks and method steps have been arbitrarily defined herein for the convenience of the description. Alternate boundaries may be defined so long as the specified functions and relationships thereof are appropriately performed. Any such alternate boundaries are thus within the scope and spirit of the claimed invention. One skilled in the art will recognize that these functional building blocks may be implemented by discrete components, application-specific integrated circuits, processors executing appropriate software or the like, or any combination thereof. Thus, the breadth and scope of the present invention should not be limited by any of the above-described exemplary embodiments, and should be defined only in accordance with the following claims and their equivalents.

What is claimed is:

1. A method comprising:
   distributing photons over a computer graphics scene comprising a plurality of triangles; and for a first triangle,
   constructing a list of photons that strike the first triangle;
   building a first kd-tree of photons for the first triangle;
   selecting at least one control point in the first triangle;
   computing a specific illumination estimate for each control point in the first triangle based on at least one photon in the kd-tree of photons;
   building a first kd-tree of control points distinct from the first kd-tree of photons for the first triangle;
   determining an illumination estimate for the first triangle based on at least one control point in the kd-tree of control points; and
   displaying the first triangle having the illumination estimate on an output device.

2. The method of claim 1, further comprising:
   determining whether the first triangle is struck by any photons;
   if no photons struck the first triangle,
      creating auxiliary control points for the first triangle for use as selected control points; and
      sending photons into the first triangle through semispheres that surround said auxiliary control points respectively.

3. The method of claim 2, wherein said selecting of control points is based on at least one of the group consisting of:
   desired image quality;
   size of the first triangle; and
   rate of change of illumination of the first triangle.

4. The method of claim 2, wherein said computing of the specific illumination estimate for each control point comprises:
   choosing a radius of a circle surrounding the control point;
   finding photons that fall within the circle;
   summing the energy of photons that fall within the circle to produce a sum; and
   dividing the sum by an area of intersection of the circle and the first triangle, to produce the specific illumination estimate for the control point.

5. The method of claim 4, wherein said sequence of choosing a radius, finding photons, summing the energy, and dividing the sum is performed in parallel for a plurality of control points.

6. The method of claim 4, wherein said computation of the specific illumination estimate comprises finding each control point by traversing the first kd-tree of photons.

7. The method of claim 1, wherein, for each point struck by a sample ray in the first triangle, the determining an illumination estimate comprises:
   finding in the first triangle the control point that is closest to the point struck by a sample ray; and
   setting the illumination at the point struck by the ray equal to the illumination at the closest control point.

8. The method of claim 7, wherein said sequence of finding the closest control point and setting the illumination is performed in parallel for a plurality of points struck by respective sample rays.

9. The method of claim 7, wherein said finding in the first triangle of the control point closest to the point struck by the sample ray comprises traversing the first kd-tree of control points.

10. The method of claim 1, wherein said sequence of constructing a list, selecting at least one control point, computing an illumination estimate, building a first kd-tree, and estimating illumination is performed in parallel for the plurality of triangles.

11. The method of claim 1, further comprising:
   for a second triangle,
      constructing a list of photons that strike the second triangle;
      selecting at least one control point in the second triangle;
      computing a specific illumination estimate for each control point in the second triangle;
      building a second kd-tree of control points, in the second triangle; and
      estimating illumination for the second triangle.

12. A method comprising:
   distributing photons over a computer graphics scene comprising at least one triangle; and
   for each of the at least one triangle that is struck by a photon,
      building a kd-tree of photons for the triangle;
      selecting at least one control point in the triangle;
      computing a specific illumination estimate for each control point based on at least one photon in the kd-tree of photons;
      building a kd-tree of control points distinct from the kd-tree of photons for the triangle;
      determining an illumination estimate for the triangle based on at least one control point in the kd-tree of control points; and
      displaying the triangle having the illumination estimate on an output device.

13. The method of claim 12, wherein the determining an illumination estimate comprises, for each point struck by a sample ray in the triangle:
   finding in the triangle the control point that is closest to the point struck by the ray; and
   setting the illumination at the point struck by the ray equal to the illumination at the closest control point.

14. A tangible machine accessible medium having computer program logic recorded thereon that, when executed by a processor, causes said processor to execute a method comprising:
   distributing photons over a computer graphics scene, the scene comprising at least one triangle;
   identifying, for each of the at least one triangle, photons that strike the triangle;
   organizing the photons for the triangle into a kd-tree of photons for the triangle;
   selecting at least one control point in each of the at least one triangle;
   determining a specific illumination estimate for each control point based on at least one photon in the kd-tree of photons for the triangle;
   for each of the at least one triangle, organizing data representative of the control points into a kd-tree of control points distinct from the kd-tree of photons;
   determining an illumination estimate for each of the at least one triangle based on at least one control point in the kd-tree of control points; and
   displaying each of the at least one triangle having the illumination estimate on an output device.

15. The tangible machine accessible medium of claim 14, further comprising:
   for each of the at least one triangle, determining whether the triangle is struck by any photons and,
   if no photons struck the triangle,
      creating auxiliary control points for the triangle for use as selected control points; and
      sending photons into the triangle through semispheres that surround said auxiliary control points respectively.

16. The tangible machine accessible medium of claim 15, wherein said determining of a specific illumination estimate for each control point comprises:
   choosing a circle surrounding the control point;
   finding the photons falling within the circle by traversing the kd-tree of photons;
   summing the energy of photons that fall within the circle to produce a sum; and
   dividing the sum by an area of intersection of the circle and the triangle, to produce the specific illumination estimate for the control point.

17. The tangible machine accessible medium of claim 14, wherein said determining an illumination estimate comprises:
   for each of the at least one triangle and for each point in the triangle, for a sample ray that strikes the point, finding the control point in the triangle that is closest to the point struck by the ray; and
   setting the illumination at the point struck by the ray equal to the illumination at the closest control point.

18. A tangible machine accessible medium having computer program logic recorded thereon that, when executed by a processor, causes said processor to execute a method comprising:
   distributing photons over computer graphics scene, the scene comprising at least one triangle;
   identifying, for each of the at least one triangle, photons that strike the triangle;
   organizing the photons for the triangle into a kd-tree of photons for the triangle;
   selecting at least one control point in each of the at least one triangle that is struck by a photon;
   determining a specific illumination estimate for each control point based on at least one photon in the kd-tree of photons for the triangle;
   for each of the at least one triangle, organizing data representative of the control points into a kd-tree of control points distinct from the kd-tree of photons;
   determining an illumination estimate for each of the at least one triangle based on at least one control point in the kd-tree of control points; and
   displaying each of the at least one triangle having the illumination estimate on an output device.

19. The tangible machine accessible medium of claim 18, wherein estimation of illumination comprises:
   for each of the at least one triangle that is struck by a photon and for each point in the triangle, for a sample ray that strikes the point, finding the control point in the triangle that is closest to the point struck by the ray; and
   setting the illumination at the point struck by the ray equal to the illumination at the closest control point.

20. A computer graphics renderer that determines illumination of a computer graphics scene and that comprises a programmable processor and a machine accessible medium having computer program logic recorded thereon that, when executed by the processor, causes the processor to execute a method comprising:
   distributing photons over a computer graphics scene comprising at least one triangle; and
   for each of the at least one triangle struck by a photon,
      constructing a list of photons that strike the triangle;
      building a kd-tree of photons for the triangle;
      selecting at least one control point in the triangle;
      computing a specific illumination estimate for each control point based on at least one photon in the kd-tree of photons;
      building a kd-tree of control points distinct from the kd-tree of photons for the triangle;
      determining an illumination estimate for the triangle based on at least one control point in the kd-tree of control points; and displaying the triangle having the illumination estimate on an output device.

21. The computer graphics renderer of claim 20, wherein the computer program logic, when executed by the processor, causes the processor to execute said selecting of at least one control point, wherein said selecting comprises:
   organizing the photons for the triangle into a kd-tree of photons for the triangle;
   traversing the kd-tree of photons, and
   selecting control points for the triangle from among the photons encountered during said traversal; and
   wherein said estimating of illumination comprises:
      for each of the at least one triangle that is struck by a photon and for each point in the triangle, for a sample ray that strikes the point, finding the control point in the triangle that is closest to the point struck by the ray; and
      setting the illumination at the point struck by the ray equal to the illumination at the closest control point.

22. A method recorded on a tangible computer-readable medium, comprising:
   distributing photons over a computer graphics scene comprising a plurality of triangles; and
   for a first triangle,
      constructing a list of photons that strike the first triangle;
      building a first kd-tree of photons for the first triangle;
      selecting at least one control point in the first triangle;
      computing a specific illumination estimate for each control point in the first triangle based on at least one photon in the kd-tree of photons;
      building a first kd-tree of control points in the first triangle distinct from the kd-tree of photons;
      determining an illumination estimate for the first triangle based on at least one control point in the kd-tree of control points; and
      storing the illumination estimate in a machine accessible medium.

* * * * *